(No Model.) 2 Sheets—Sheet 1.
W. P. THOMAS & R. DAVIES.
APPARATUS FOR COATING METALS.
No. 566,880. Patented Sept. 1, 1896.
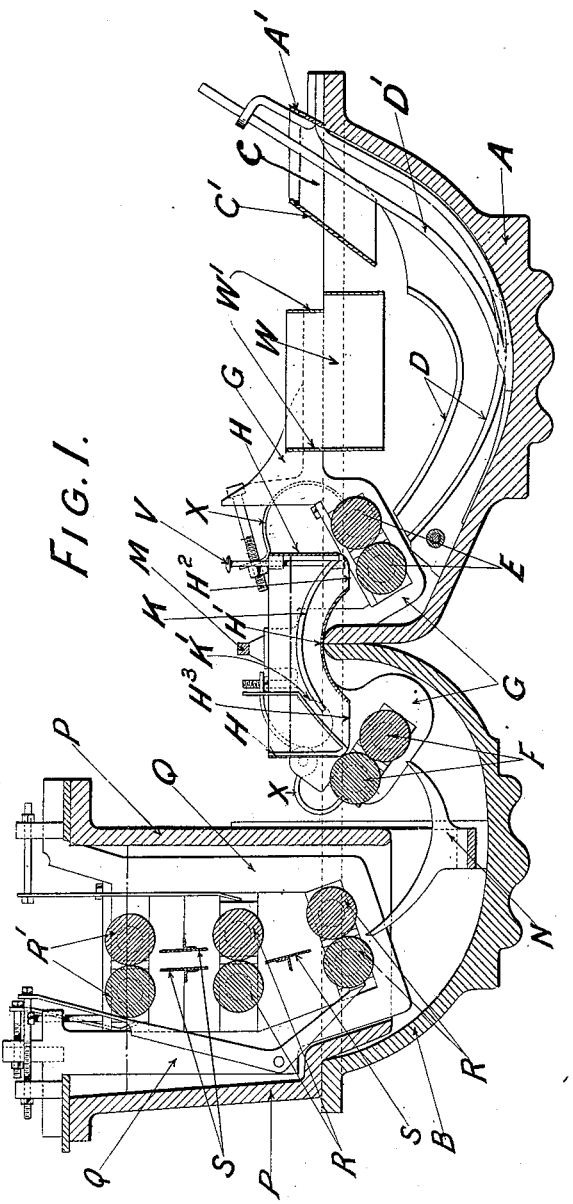
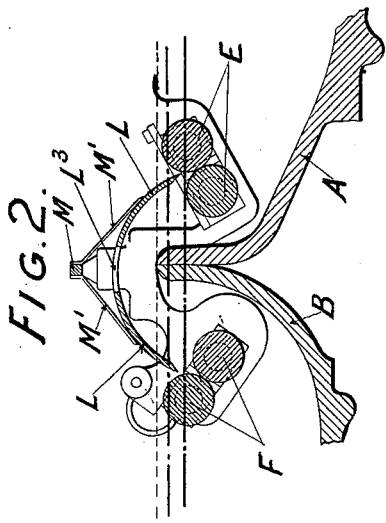
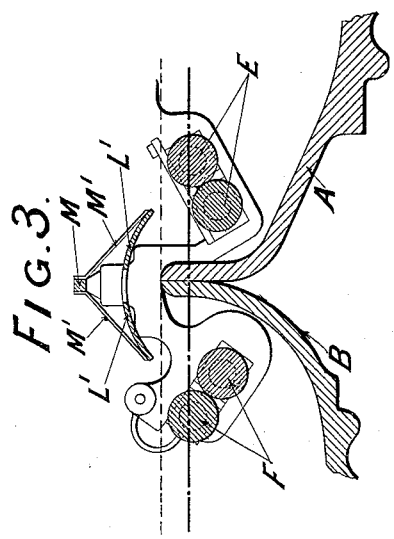
WITNESSES.
H. van Dedennees
E. A. Scott
INVENTORS.
Wyndham Partridge Thomas
Robert Davies
By Richardson
Attorneys (No Model.) 2 Sheets—Sheet 2.
W. P. THOMAS & R. DAVIES.
APPARATUS FOR COATING METALS.
No. 566,880. Patented Sept. 1, 1896.
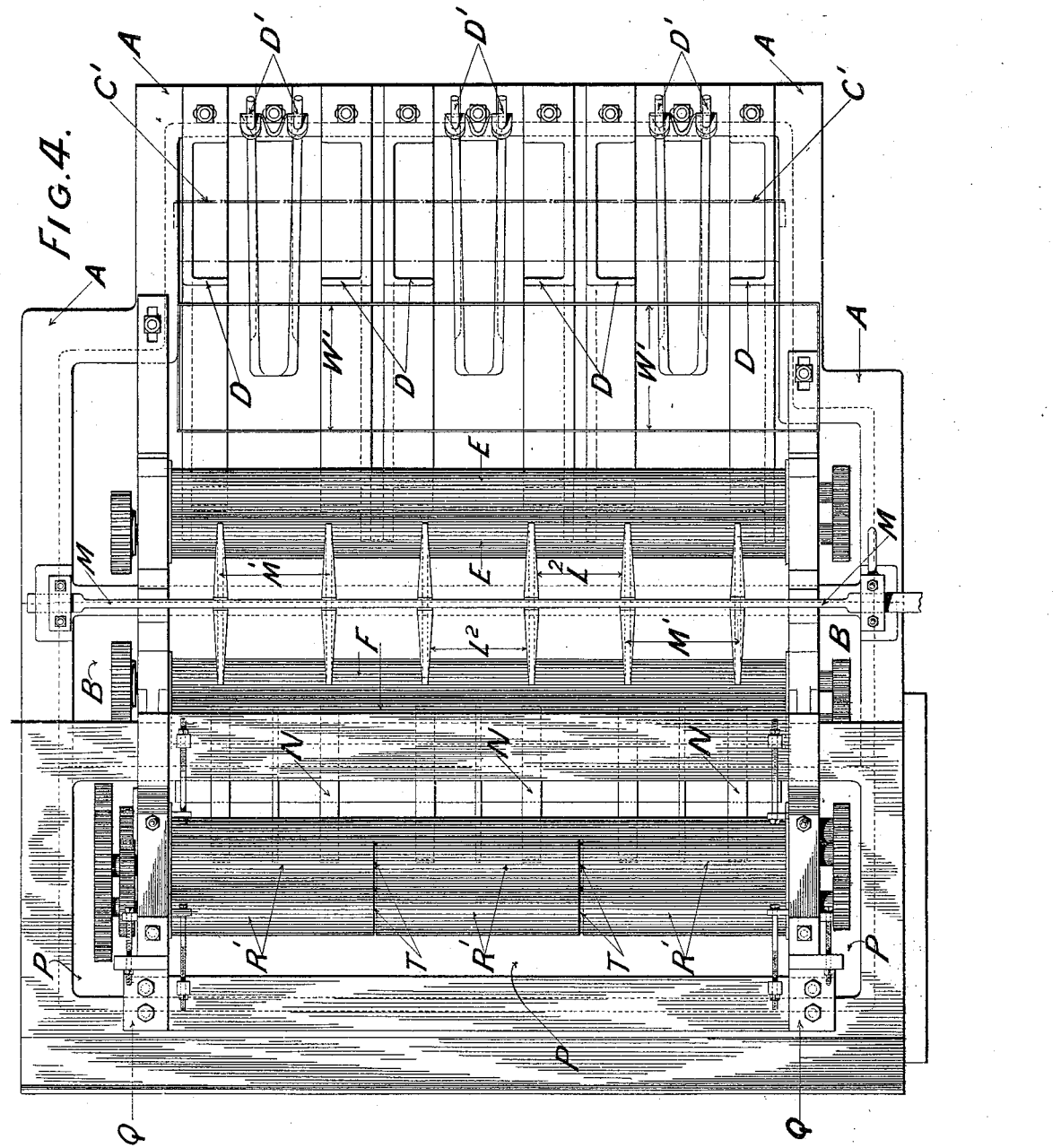
WITNESSES.
H. van Oldenneel
E. A. Scott
INVENTORS.
Wyndham Partridge Thomas
Robert Davies
by Richards
Attorneys United States Patent Office.

WYNDHAM PARTRIDGE THOMAS, OF PENARTH, AND ROBERT DAVIES, OF WHITCHURCH, ENGLAND; SAID DAVIES ASSIGNOR TO SAID THOMAS.

APPARATUS FOR COATING METALS.

SPECIFICATION forming part of Letters Patent No. 566,880, dated September 1, 1896.

Application filed July 10, 1895. Serial No. 555,472. (No model.) Patented in England March 10, 1893, No. 5,224.

*To all whom it may concern:*

Be it known that we, WYNDHAM PARTRIDGE THOMAS, residing at Penarth, and ROBERT DAVIES, residing at Whitchurch, county of Glamorgan, in Wales, subjects of the Queen of Great Britain and Ireland, have invented certain new and useful Improvements in Apparatus for Coating Metals with Tin and other Metals, (for which we have obtained a patent in Great Britain, No. 5,224, bearing date March 10, 1893,) of which the following is a specification.

Our invention includes the special features and arrangements hereinafter fully set forth and claimed.

In the accompanying drawings, Figure 1 is a longitudinal section of our apparatus. Figs. 2 and 3 are detail longitudinal sections showing modifications of the same, and Fig. 4 is a plan showing a modification.

The customary two pots, namely, a coating-pot A and a dipping-pot B, are placed in juxtaposition, and we prefer to make these two pots rather shallow and to round off the bottoms thereof, as is shown in Fig. 1. The advantages that are secured by this manner of formation are many, as, for example—not to mention those that will be pointed out hereinafter—more freedom than is usual is afforded for the expansion of the metal on melting and for the contraction of the same on cooling or solidifying, whereby these pots will not be so liable to burst as are the ordinary pots; and, again, these pots can be the more easily cleaned out and the inner surfaces thereof freed from any possible scale or deposit. The pots A and B are filled up to the required level with the molten tin or other metal.

At the entering end of the coating-pot A is fitted a fluxing-chamber C, formed by a partition C', extending across such pot A and dipping into the metal therein, and, if necessary, by extensions A' upward of the sides and end of the pot A. This sealed chamber C is filled up to the required level with grease or oil or other flux or other customary material. The plate to be treated is passed by hand or otherwise through the fluxing-chamber C into the metal in the pot A and is entered between fixed curved guides D in the metal. It may be directed thereinto by adjustable supplementary guides D', extending upward out of the pot A. The plate is pushed or taken along the guides D until its leading edge enters between and is caught by a pair of rolls E, mounted across the other end of the pot A. It may be a little below the surface of the metal therein. From the rolls E the plate is to be passed to another pair of rolls F, complementarily mounted across the adjoining end of the dipping-pot B. It may also be a little below the surface of the metal therein. These two pairs of rolls E and F are most conveniently so mounted in such brackets that they can readily be lifted thereout, for which purpose the brackets G (shown in the drawings) are very suitable.

To lead the plate from the rolls E to the rolls F, over the adjoining edges of the pots A and B, curved guides are provided, which may be either single or double, as may be preferred in each particular case. When double guides are provided, as is shown in Fig. 1, the lower curved guide H' can form the bottom of a continuous open trough H, extending across the pots A and B, while the upper curved guides K are bars fitted in this trough H parallel with the bottom H'. The sides of the trough H dip into the metal in the pots A and B, and near thereto are made in the bottom H' two long transverse slots or openings $H^2$ and $H^3$, in the proper positions in respect of the rolls E and F, which slots $H^2$ and $H^3$ are sealed by the metal, wherefore this trough H can be filled up to the required level with palm-oil or other flux or suitable material. The plate enters this trough H from the rolls E through the slot $H^2$, and, being led between the guides H' and K, issues from the same to the rolls F through the slot $H^3$. In this arrangement it is convenient to form passages K' through the upper guides K, wherethrough a plate can be entered whensoever it may be desired to pass the same again through the pot B, and also to fit a loose vertically-sliding rod V on the side of the trough H above the entering-slot $H^2$, which can be tripped by the following edge of the plate when it leaves the rolls E and give notice to the attendant of such fact, or produce any desired effect to draw attention or otherwise. When, on the other hand, only single guides are to be provided, the trough, properly formed therefor, is inverted and itself forms the upper and only curved guide, being supported in position from the transverse bar M, extending across the pots A and B by arms M'. This inverted open trough L could similarly extend across the pots A and B, and the edges thereof could dip into the metal in such pots A and B, as is shown in Fig. 2, in the proper positions in respect of the rolls E and F. Thus this trough L likewise is seated by the metal in the pots A and B, wherefore it also can be filled up to the required level with palm-oil or other flux or suitable material through an aperture or apertures $L^3$ made therefor in the crown of this inverted trough L. Again, the edges of the inverted trough L' could be shortened, so that they would not dip into the metal, as is shown in Fig. 3, being only prolonged far enough to catch the leading edge of the plate when it issues from the rolls E and guide it to the rolls F. In this case, further, it is obvious that the inverted trough need not necessarily be continuous, extending across the pots A and B, but may be non-continuous or intercepted, being divided into a number of separate curved bars $L^2$, as is shown in Fig. 4. It is very obvious, however, that, whether double or single guides are provided, the plate is properly led from the rolls E to the rolls F over the intervenient adjoining edges of the pots A and B without being handled by the attendant, while, when the trough, whether inverted or not, contains a flux, this plate need not even be exposed to the air.

From the rolls F the plate is led by fixed curved guides N in the metal in the pot B under one side of and up into the sealed open bottom of a grease-pot P, extending across and supported by the exit end of the pot B, and dipping into the metal therein, which pot P is filled up to the required level with grease or other ordinary material. In this pot P are fitted the customary or other brackets Q, which carry in any usual manner a series of pairs of rolls R, guides S being, if desired, provided between them; and the lowermost pair of rolls R are preferably about the level of the surface of the metal in the pot B, while the uppermost pair of rolls R' are preferably at the level of the surface of the grease or other material in this pot P. The leading edge of the plate as it leaves the guides N is entered between and is caught by the lowermost rolls R, and by the series of rolls R is passed up the pot P until the plate emerges from the top of the grease-pot P properly finished, so far as this treatment is concerned. Afterward the plate can, if desired, be further treated in any customary or other manner, as may be convenient.

As is hereinbefore stated, this apparatus is preferably made broad enough to receive and treat at least three plates, side by side, at one and the same time, and in Fig. 4 it is shown as adapted for three plates. In this case three sets of guides and other devices are provided; but no longitudinal partitions or the like are fitted, so that the lateral edges of the plates may be in close juxtaposition, whereby not only may the pots and the whole apparatus be made as narrow as is compatible with the conditions of the case, but also all the plates will be within the easy reach of the usual attendant on this apparatus. The rolls, however, obviously can only have their usual end bearings, and they must therefore be carefully made of good material to insure that they shall constantly maintain their exact and true lines throughout their lengths, as it is necessary to treat all the plates quite equally. The uppermost rolls R' in the grease-pot P preferably have two narrow circumferential grooves T created in their surfaces, where the adjacent edges of the plates are to pass, so that the molten metal that is put on these rolls R' for lubricating purposes shall not run along the whole length of the same, but each part shall enjoy its allotted proportion.

This apparatus and all the several parts thereof can be maintained at the desired temperatures in any usual manner and by any ordinary appliances.

Any suitable springs X may be provided to put the necessary pressure on each pair of rolls, which likewise may all be revolved at the desired speed by any ordinary gearing. As is very obvious, all these pots are of extremely small dimensions in proportion to the work they can perform, while the pots for the metal may be shallow with rounded-off bottoms, whereby the quantity of molten metal that is required and, indeed, can be held therein must be small likewise, to the manifest economy of fuel. It is further very obvious that the surfaces of the molten metal and the flux in these pots are of small area, whereby the oxidation and evaporation that must always to some extent occur will be greatly reduced, to the manifest economy of material. To still further reduce the oxidation, it is convenient to create a sealed chamber W by dipping-partitions W', extending across the pot A and arranged between the chamber C and the rolls E, and can be filled up to the required level with grease or oil or other suitable material, and thus the area of the surface of the molten metal in the pot A exposed to oxidation will be reduced to a minimum. The same arrangement can be followed in respect of the pot B when possible; but almost invariably it will be found that the area of the surface of the molten metal in this pot B, so exposed to oxidation, has already been reduced to a minimum.

Having now described our invention, what we claim as new, and desire to secure by Letters Patent, is—

1. In apparatus such as described, the combination in a trough H for flux or other material mounted over the adjoining edges of a coating-pot A and a dipping-pot B both filled with metal, of a curved bottom H' to form a lower guide, slots $H^2$ and $H^3$ in such bottom H' sealed by the metal in the pots A and B, upper guides K above such bottom H', passages K' through such guides K, and a sliding rod V above the entering-slot $H^2$, substantially as described.

2. The combination in a coating-pot A filled with metal, of a sealed fluxing-chamber C at the entering end thereof, fixed guides D in and adjustable guides D' partly in the metal therein, a pair of rolls E at the exit end thereof, guides to lead the plate thereout to the next stage of its treatment, and a sealed chamber W for grease or other material placed therein between the chamber C and the rolls E, substantially as described.

In witness whereof we have hereunto set our hands in presence of two witnesses.

WYNDHAM PARTRIDGE THOMAS.
ROBERT DAVIES.

Witnesses:
WALLER COOK,
PERCY COX.